United States Patent
Tanaka et al.

(10) Patent No.: US 11,092,769 B2
(45) Date of Patent: Aug. 17, 2021

(54) OPTICAL CAP COMPONENT

(71) Applicant: NIPPON ELECTRIC GLASS CO., LTD., Otsu (JP)

(72) Inventors: Hirokazu Tanaka, Otsu (JP); Hideki Nagata, Otsu (JP); Kazuki Komai, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 102 days.

(21) Appl. No.: 16/347,287

(22) PCT Filed: Nov. 30, 2017

(86) PCT No.: PCT/JP2017/043123
§ 371 (c)(1),
(2) Date: May 3, 2019

(87) PCT Pub. No.: WO2018/163540
PCT Pub. Date: Sep. 13, 2018

(65) Prior Publication Data
US 2019/0278043 A1    Sep. 12, 2019

(30) Foreign Application Priority Data
Mar. 10, 2017   (JP) .............................. JP2017-045544

(51) Int. Cl.
*G02B 7/02*   (2021.01)
(52) U.S. Cl.
CPC ..................................... *G02B 7/02* (2013.01)

(58) Field of Classification Search
CPC . G02B 7/00; G02B 7/02; G02B 7/027; G02B 7/022; G02B 7/025; G02B 6/32;
(Continued)

(56) References Cited

U.S. PATENT DOCUMENTS

| 4,726,645 A * | 2/1988 | Yamashita ........... G02B 6/4204 385/35 |
| 2003/0072543 A1 | 4/2003 | Yoshizawa |

(Continued)

FOREIGN PATENT DOCUMENTS

| CN | 1550461 A | 12/2004 |
| CN | 101553748 A | 10/2009 |

(Continued)

OTHER PUBLICATIONS

Official Communication issued in International Patent Application No. PCT/JP2017/043123, dated Feb. 27, 2018.

(Continued)

*Primary Examiner* — Jie Lei
(74) *Attorney, Agent, or Firm* — Keating and Bennett, LLP

(57) ABSTRACT

Provided is an optical cap component in which a lens is attached to a shell with a high positional accuracy. An optical cap component 1 according to the present invention includes: a shell 30 with an opening 32a; a lens 20 inserted into and fixed in the opening 32a of the shell 30; and a fixing member 40 that fixes the lens 20 and the shell 30 together, wherein the opening 32a has an inside diameter larger than a diameter of the lens 20, and the fixing member 40 is made of glass containing an inorganic filler 41.

6 Claims, 1 Drawing Sheet

(58) Field of Classification Search
CPC . G02B 6/36; G02B 6/42; G02B 6/322; G02B 6/3616; G02B 6/4204
USPC ..... 359/819, 811, 821, 703, 704; 385/92–94
See application file for complete search history.

(56) References Cited

U.S. PATENT DOCUMENTS

| | | |
|---|---|---|
| 2003/0179993 A1 | 9/2003 | Shigenaga et al. |
| 2004/0244422 A1 | 12/2004 | Yoneda et al. |
| 2007/0217741 A1 | 9/2007 | Shigenaga et al. |
| 2007/0229964 A1 | 10/2007 | Yoneda et al. |
| 2008/0028794 A1 | 2/2008 | Yoneda et al. |
| 2010/0118416 A1 | 5/2010 | Do |

FOREIGN PATENT DOCUMENTS

| | | |
|---|---|---|
| JP | 02-022612 A | 1/1990 |
| JP | 06-201962 A | 7/1994 |
| JP | 08-179178 A | 7/1996 |
| JP | 08-313779 A | 11/1996 |
| JP | 10-031143 A | 2/1998 |
| JP | 2003-098407 A | 4/2003 |
| JP | 2004-004432 A | 1/2004 |
| JP | 2006-126272 A | 5/2006 |
| JP | 2006-133504 A | 5/2006 |

OTHER PUBLICATIONS

Official Communication issued in corresponding Chinese Patent Application No. 201780068965.6, dated Dec. 2, 2020.

\* cited by examiner

[FIG. 1]
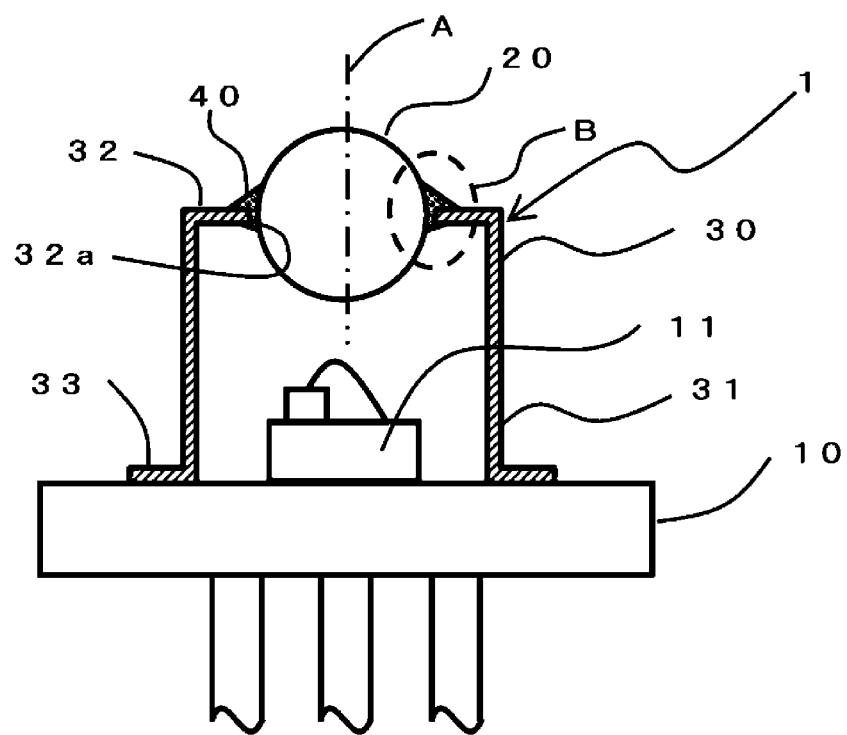
[FIG. 2]
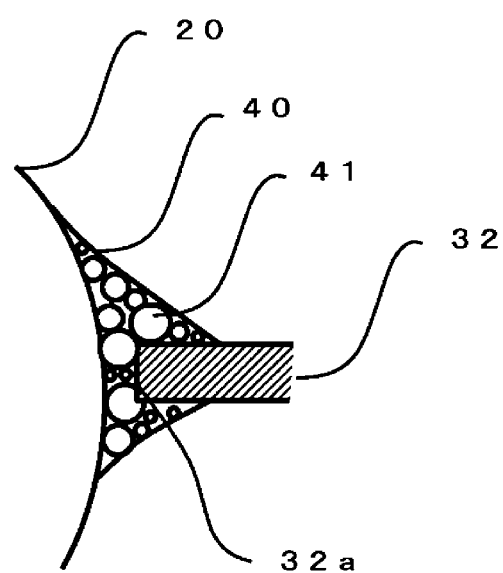

OPTICAL CAP COMPONENT

TECHNICAL FIELD

The present invention relates to optical cap components.

BACKGROUND ART

Generally, an optical cap component is a component that covers an optical element, such as a light-emitting element or a light-receiving element, for use in optical communications, optical sensors, and so on and, for example, has a structure in which its interior is maintained airtight to enable appropriate light input and output to and from the optical element. This type of optical cap component has been variously proposed or put into practical use as disclosed in Patent Literature 1 and so on and generally includes a tubular shell and a lens attached to the shell.

In order to achieve excellent optical properties, such an optical cap component is desired to have a high positional accuracy between the lens and the optical element. Normally, the optical element is positioned relative to the shell. Therefore, from the viewpoint of increasing the positional accuracy between the lens and the optical element, it is important that the lens be attached to the shell with a high positional accuracy.

CITATION LIST

Patent Literature

[PTL 1]
JP-A-2006-126272

SUMMARY OF INVENTION

Technical Problem

A method commonly applied to increase the positional accuracy of the lens relative to the shell is to make the diameter of the lens larger than the inside diameter of an opening formed in the shell and fix the lens and the shell together through the interposition of a fixing member, such as glass powder, between the lens and the shell.

However, when the diameter of the lens is larger than the inside diameter of the opening of the shell, the lens rests on top of the fixing member and, therefore, may move due to bubbles produced from spaces between the glass powder particles during softening and flow of the glass powder, the disappearance of the bubbles or volume changes of the glass during solidification of the softened glass, which decreases the positional accuracy of the lens relative to the shell.

An object of the present invention is to provide an optical cap component in which a lens is attached to a shell with a high positional accuracy.

Solution to Problem

An optical cap component according to the present invention includes: a shell with an opening; a lens inserted into and fixed in the opening of the shell; and a fixing member that fixes the lens and the shell together, wherein the opening has an inside diameter larger than a diameter of the lens, and the fixing member is made of glass containing an inorganic filler.

Furthermore, in the optical cap component according to the present invention, the inorganic filler is interposed between the shell and the lens.

Moreover, in the optical cap component according to the present invention, the inorganic filler has an average particle diameter 0.4 to 0.7 times a difference between the inside diameter of the opening and the diameter of the lens.

Furthermore, in the optical cap component according to the present invention, the inorganic filler is made of at least one of silica, alumina, zinc oxide, tin oxide, and zirconium oxide.

Moreover, in the optical cap component according to the present invention, a content of the inorganic filler in the fixing member is 20% by volume to 60% by volume.

Furthermore, in the optical cap component according to the present invention, a difference between the inside diameter of the opening and the diameter of the lens is 30 μm or less.

Moreover, in the optical cap component according to the present invention, a distance between an optical axis of the lens and a central axis of the opening is 20 μm or less.

Advantageous Effects of Invention

The present invention enables provision of an optical cap component in which a lens is attached to a shell with a high positional accuracy.

BRIEF DESCRIPTION OF DRAWINGS

FIG. 1 is a schematic cross-sectional view of an optical cap component according to an embodiment of the present invention.

FIG. 2 is a schematic cross-sectional view of a part B in FIG. 1.

DESCRIPTION OF EMBODIMENTS

The optical cap component according to the present invention has an inside diameter of the opening of the shell larger than the diameter of the lens and the fixing member for fixing the lens and the shell together contains an inorganic filler. Therefore, even if bubbles produced from spaces between glass powder particles during softening and flow of the glass powder, the disappearance of the bubbles or volume changes of the glass during solidification attempt to cause the lens to be displaced relative to the shell, the inorganic filler is wedgingly interposed between the opening of the shell and the lens, so that the lens is fixed and becomes difficult to move. Thus, the displacement of the lens relative to the shell can be prevented.

Hereinafter, a description will be given of an example of a preferred embodiment for working of the present invention. However, the following embodiment is simply illustrative. The present invention is not at all limited by the following embodiment.

Furthermore, throughout the drawings to which the embodiment and the like refer, elements having substantially the same functions will be referred to by the same reference signs. The drawings to which the embodiment and the like refer are schematically illustrated and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

FIG. 1 is a schematic cross-sectional view of an optical cap component 1 according to this embodiment.

The optical cap component 1 is attached to an optical device 10 including an optical element 11, such as a light-emitting element or a light-receiving element, for use in optical communications, optical sensors, and so on. The optical cap component 1 has not only optical functions of focusing light on the optical element 11 and performing diffusion or collimation of light from the optical element 11, but also a function as a cap that maintains the optical element 11 airtight. Therefore, the mounting of the optical cap component 1 on the optical device 10 prevents contact of the optical element 11 with oxygen and moisture, thus preventing deterioration of the optical element 11.

The optical cap component 1 includes a lens 20, a shell 30, and a fixing member 40.

The lens 20 is, in this embodiment, a lens in which both lens surfaces are convex lens surfaces. Specifically, the lens 20 is a spherical ball lens.

The shell 30 is made of metal. The shell 30 is preferably made of an iron alloy and more preferably made of an iron alloy containing at least one of chromium and nickel. Specific example of the iron alloy containing at least one of chromium and nickel include iron-nickel-cobalt alloy (kovar) and iron-chromium-nickel alloy (stainless steel).

The shell 30 has a shell body 31. The shell body 31 is tubular. Specifically, in this embodiment, the shell body 31 is cylindrical. The shell body 31 extends along a direction parallel to a direction of extension of the optical axis A of the lens 20.

The shell body 31 is connected at one end to a first flange portion 32 extending inwardly from the shell body 31.

The first flange portion 32 has an opening 32a. The lens 20 is inserted into and fixed in this opening 32a. The shape and size of the opening 32a can be appropriately set according to the shape and size of the lens 20. Generally, the opening 32a is provided to have a circular shape and has an inside diameter of about 0.7 mm to about 3.0 mm.

The inside diameter of the opening 32a is set larger than the diameter of the lens 20. Therefore, a clearance is provided between the opening 32a and the lens 20. The difference between the inside diameter of the opening 32a and the diameter of the lens is preferably 30 μm or less, more preferably 25 μm or less, and still more preferably 20 μm or less.

Furthermore, the distance between the optical axis A of the lens 20 and the central axis of the opening 32a is preferably 20 μm or less, more preferably 10 μm or less, and still more preferably 5 μm or less.

The shell body 31 is connected at the other end to a second flange portion 33 extending outwardly from the shell body 31. The optical cap component 1 is attached to the optical device 10 by welding the second flange portion 33 and the optical device 10. The welding of the second flange portion 33 and the optical device 10 can be performed by resistance welding, such as projection welding, laser welding or other types of welding.

The lens 20 and the shell 30 are fixed together by the fixing member 40. As shown in FIG. 2, the fixing member 40 is made of glass containing an inorganic filler 41. The glass forming the fixing member 40 is preferably a low-melting-point glass. The term "low-melting-point glass" as used in the present invention refers to glass having a glass transition temperature of 350° C. or below.

The inorganic filler 41 is preferably made of at least one of, for example, silica, alumina, zinc oxide, tin oxide, and zirconium oxide. Particularly, the inorganic filler 41 is more preferably made of zinc oxide or tin oxide that have such moderate hardness and strength that they are kept from crushing during interposition between the lens 20 and the shell 30.

Generally, in order to increase the positional accuracy of the lens relative to the shell, it is considered desirable to make the diameter of the lens larger than the inside diameter of an opening formed in the shell and fix the lens and the shell together through the interposition of a fixing member between the lens and the shell. However, when the diameter of the lens is larger than the inside diameter of the opening of the shell, the lens rests on top of the fixing member and, therefore, may move due to bubbles produced from spaces between the glass powder particles during softening and flow of the glass powder, the disappearance of the bubbles or volume changes of the glass during solidification of the softened glass, which decreases the positional accuracy of the lens relative to the shell.

Unlike the above, in this embodiment, the inside diameter of the opening 32a of the shell 30 is larger than the diameter of the lens 20 and, in addition, the fixing member 40 fixing the lens 20 and the shell together is made of glass containing an inorganic filler 41. Therefore, even if bubbles produced from spaces between glass powder particles during softening and flow of the glass powder, the disappearance of the bubbles or volume changes of the glass during solidification attempt to cause the lens 20 to be displaced relative to the shell 30, the inorganic filler 41 is wedgingly interposed between the opening 32a of the shell 30 and the lens 20, so that the lens 20 is fixed and becomes difficult to move. Thus, the displacement of the lens 20 relative to the shell 30 can be prevented. Hence, when the fixing member 40 contains the inorganic filler 41, it is possible to easily produce an optical cap component 1 in which the lens 20 is placed with a high positional accuracy relative to the shell 30.

Note that the distance between the optical axis A of the lens 20 and the central axis of the opening 32a is preferably 20 μm or less, more preferably 10 μm or less, and still more preferably 5 μm or less.

Furthermore, the average particle diameter of the inorganic filler 41 is preferably 0.4 to 0.7 times the difference between the inside diameter of the opening 32a and the outside diameter of the lens 20, and more preferably 0.45 times to 0.6 times the difference. When the average particle diameter of the inorganic filler 41 is within the above range, the lens 20 is less likely to fall off the opening 32a when the glass becomes softened. If the average particle diameter of the inorganic filler 41 is too small as compared to the difference between the inside diameter of the opening 32a and the outside diameter of the lens 20, the effect of preventing the lens 20 from moving may not sufficiently be developed even when the inorganic filler 41 can be interposed between the shell 30 and the lens 20. If the average particle diameter of the inorganic filler 41 is too large as compared to the difference between the inside diameter of the opening 32a and the outside diameter of the lens 20, the inorganic filler 41 is less likely to be interposed between the shell 30 and the lens 20.

The content of the inorganic filler 41 in the fixing member 40 is preferably 20% by volume to 60% by volume, more preferably 30% by volume to 50% by volume, and still more preferably 35% by volume to 45% by volume. If the content of the inorganic filler 41 in the fixing member 40 is too small, the effect of preventing the lens 20 from moving may not sufficiently be developed. On the other hand, if the content of the inorganic filler 41 in the fixing member 40 is too large, the sealing performance of the fixing member 40 may be low.

The difference between the inside diameter of the opening 32a and the diameter of the lens 20 is preferably 30 μm or less, more preferably 25 μm or less, and still more preferably 20 μm or less. However, if the difference between the inside diameter of the opening 32a and the diameter of the lens 20 is too small, the lens 20 may not be able to be inserted into the opening 32a. Therefore, the difference between the inside diameter of the opening 32a and the diameter of the lens 20 is preferably not less than 5 μm and more preferably not less than 10 μm.

The optical cap component described above can be produced, for example, by the following method.

A fixing member 40 in paste form or annular tablet or green sheet form with an inside diameter smaller than the diameter of a lens 20 is placed on top of the outside surface of the first flange portion 32 of the shell body 31 and the lens 20 is put on the fixing member 40. Thereafter, the lens 20 is pushed in toward the shell body 31 and the fixing member is then heated to melting and then cooled. Thus, an optical cap component 1 according to the present invention can be obtained in which the lens 20 and the shell 30 are firmly fixed together by the fixing member 40.

When pushing the lens 20 in toward the shell body 31, part of the fixing member 40 lying on the outside surface of the first flange portion 32 comes around to the back side of the first flange portion 32 through a clearance between the lens 20 and the opening 32a of the shell 30. In other words, in this process, the inorganic filler 41 contained in the fixing member 40 is wedged between the lens 20 and the first flange portion 32. Thus, the lens 20 becomes firmly fixed relative to the shell 30. Therefore, the lens 30 is less likely to be displaced relative to the shell 20 even in the heating process, which enables provision of an optical cap component 1 in which the lens 20 is placed with a high positional accuracy relative to the shell 30.

REFERENCE SIGNS LIST

1 . . . optical cap component
10 . . . optical device
11 . . . optical element
20 . . . lens
30 . . . shell
31 . . . shell body
32 . . . first flange portion
32a . . . opening
33 . . . second flange portion
40 . . . fixing member
41 . . . inorganic filler

The invention claimed is:

1. An optical cap component comprising:
a shell with an opening;
a lens inserted into and fixed in the opening of the shell; and
a fixing member that fixes the lens and the shell together, wherein
the opening has an inside diameter larger than a diameter of the lens,
the fixing member is made of glass containing an inorganic filler,
the lens is not in direct contact with any portion of the shell, and
the inorganic filler has an average particle diameter 0.4 to 0.7 times a difference between the inside diameter of the opening and the diameter of the lens.

2. The optical cap component according to claim 1, wherein the inorganic filler is interposed between the shell and the lens.

3. The optical cap component according to claim 1, wherein the inorganic filler is made of at least one of silica, alumina, zinc oxide, tin oxide, and zirconium oxide.

4. The optical cap component according to claim 1, wherein a content of the inorganic filler in the fixing member is 20% by volume to 60% by volume.

5. The optical cap component according to claim 1, wherein a difference between the inside diameter of the opening and the diameter of the lens is 30 μm or less.

6. The optical cap component according to claim 1, wherein a distance between an optical axis of the lens and a central axis of the opening is 20 μm or less.

* * * * *